United States Patent [19]

D'Aniello et al.

[11] Patent Number: 5,155,405
[45] Date of Patent: Oct. 13, 1992

[54] ELECTRODE ROLLER WITH FLEXIBLE CURRENT TRANSMITTING DISC

[75] Inventors: Alfonso D'Aniello, Widen; Niklaus Portmann, Bellikon; Peter Taiana, Staffelbach; Werner Urech, Kaiserstuhl, all of Switzerland

[73] Assignee: Elpatronic AG, Zug, Switzerland

[21] Appl. No.: 714,854

[22] Filed: Jun. 13, 1991

[30] Foreign Application Priority Data

Mar. 8, 1991 [CH] Switzerland ................ 00707/91

[51] Int. Cl.$^5$ .............. H01R 39/06; H01R 39/36; B23K 11/06
[52] U.S. Cl. .................. 310/237; 310/245; 310/249; 439/21; 219/81
[58] Field of Search ............ 310/237, 241, 242, 244, 310/245, 247, 249, 251, 252, 232; 439/11, 13, 18, 20, 21, 23; 219/61.7, 64, 80, 81, 82, 83, 84, 119, 120

[56] References Cited

U.S. PATENT DOCUMENTS

| | | |
|---|---|---|
| 2,208,977 | 7/1940 | Hall ................................ 219/4 |
| 2,276,925 | 3/1942 | Caputo ........................... 219/84 |
| 2,623,188 | 12/1952 | Tourneau et al. ............. 310/232 |
| 2,673,333 | 3/1954 | Seeloff et al. ................... 439/3 |
| 2,726,371 | 12/1955 | Seeloff .......................... 439/17 |
| 2,774,898 | 12/1956 | Tourneau ...................... 310/232 |
| 2,879,490 | 3/1959 | Campbell et al. ............. 439/28 |
| 2,908,803 | 10/1959 | Williams et al. .............. 219/84 |
| 3,325,764 | 6/1967 | Ward ............................. 439/20 |
| 3,348,018 | 10/1967 | Wood ........................... 219/119 |
| 3,400,357 | 9/1968 | Cary et al. .................... 439/20 |
| 3,414,970 | 12/1968 | Yamaguchi et al. ......... 29/597 |
| 3,464,108 | 9/1969 | Boodman et al. ............ 29/597 |
| 3,546,655 | 12/1970 | Tysver et al. ................. 339/8 |
| 3,596,225 | 7/1971 | Cary ............................. 339/5 |
| 3,599,325 | 8/1971 | Burr .............................. 29/597 |
| 3,726,003 | 4/1973 | Hellmann et al. ............. 29/597 |
| 3,735,171 | 5/1973 | Van de Griend ............. 310/235 |
| 4,181,523 | 1/1980 | Bhansali ....................... 75/171 |
| 4,433,229 | 2/1984 | Morikawa et al. ........... 219/84 |
| 4,490,637 | 12/1984 | van de Griend ............ 310/237 |
| 4,641,008 | 2/1987 | Portmann et al. ............ 219/84 |
| 4,780,589 | 10/1988 | Davies ........................... 219/84 |
| 4,803,325 | 2/1988 | Frei et al. ...................... 219/64 |

FOREIGN PATENT DOCUMENTS

| | | |
|---|---|---|
| 2559671 | 6/1977 | Fed. Rep. of Germany . |
| 3516397 | 10/1986 | Fed. Rep. of Germany . |
| 3710875 | 8/1988 | Fed. Rep. of Germany . |
| 6365485 | 6/1983 | Switzerland . |

Primary Examiner—Steven L. Stephan
Assistant Examiner—D. R. Haszko
Attorney, Agent, or Firm—McCormick, Paulding & Huber

[57] ABSTRACT

A pendulum roller head for a resistance seam-welding machine is described, having a sliding contact current transmission device between a stator and a rotor, which device is composed of an annular disc which extends radially between rotor and stator, is fastened by its outer circumference to the stator, carries an axial sliding contact ring on its inner circumference, and is flexibly designed in its bridging part between the inner and outer circumferences. The sliding contact disc is composed of a copper braid to which the axial sliding contact ring is fastened. The sliding contact current transmission device in the form of the disc with a flexible bridging part replaces the current transmission device in the form of fluid metal which has formerly been in use in pendulum roller heads.

10 Claims, 4 Drawing Sheets

ELECTRODE ROLLER WITH FLEXIBLE CURRENT TRANSMITTING DISC

BACKGROUND OF THE INVENTION

The invention relates to a roller head for a resistance seam-welding machine, having a stator, an electrode roller which is rotatably mounted as a rotor on the stator, a sliding contact current transmission device arranged between stator and rotor and is urged against at least one of them by spring force, and ducts for passage of a coolant in the stator, the rotor and the sliding contact current transmission device, the sliding contact current transmission device comprising at least one annular disc which extends radially between rotor and stator and is flexibly designed in its intermediate bridging part between the inner and outer circumferences, in accordance with U.S. Pat. application No. 667,021, filed Mar. 7, 1991.

Such a roller head, which forms the subject matter of the aforementioned patent application, represents a modification in comparison with roller heads of the type known from U.S. Pat. No. 3,546,655 and U.S. Pat. No. 3,596,225, which are not suitable as a substitute for fluid roller heads which are known, for example, from CH-A No. 639 548 and U.S. Pat. No. 4,181,523. Such fluid roller heads are used for welding inside narrow can bodies. Between the stator and the rotor is provided an annular gap, in which there is a fluid metal, for example, quicksilver or a gallium alloy, which serves for current transmission from the stator to the rotor. As such roller heads require careful sealing and constant checking of this sealing, and as the fluid metals used are not particularly good heat conductors, and by comparison with copper, are not good electrical current conductors, and moreover, with the use of a gallium alloy, problems may arise because this metal alloy solidifies at temperatures not very far below room temperature, an attempt is made to avoid fluid as a sliding contact current transmission device and replace it by non-fluid metallic sliding contacts. As the abovementioned known roller heads with an internally situated sliding contact current transmission device are inferior to fluid roller heads in regard to current transmission capacity and length of life, because they have costly brush constructions as a sliding contact current transmission device or as a component thereof, the roller head according to U.S. Patent application Ser. No. 667,021 has been provided, which in regard to assembly dimensions, current transmission capacity and length of life, is comparable with the fluid roller heads which have been used up to now and which it is intended to replace, and the sliding contact current transmission device between stator and rotor also has a contact pressure which remains practically uninfluenced by vibrations, eccentricity etc. This is achieved because the sliding contact current transmission device is composed of at least one annular disc, which extends radially between rotor and stator and is flexibly designed in its intermediate part between rotor and stator. Moreover, the roller head according to the U.S. Patent application Ser. No. 667,021 manages with a minimum number of comp which considerably reduces manufacturing costs, maintenance expenditure and wear.

Practical use of the roller head according to U.S. Patent application No. 667,021 has shown that there is a great demand for the current transmission principle of this roller head to be made usable in other spheres.

The problem of the invention is therefore to broaden the area of application of the roller head.

SUMMARY OF THE INVENTION

This problem is solved according to the invention in a roller head of the type hereinbefore mentioned, in that the disc is arranged as a sliding contact current transmission device in the region of the other end of the shaft between the shaft and the stator, for a use of the roller head as a pendulum roller head in which the rotor is in the form of a shaft which carries the electrode roller at one end and is rotatably mounted by the other end in the stator.

Basically, in a known pendulum roller head as illustrated in FIGS. 4 and 5, which correspond to FIGS. 3 or 4 of DE-C2 No. 37 10 875, the same problems occur as in the known fluid roller heads hereinbefore mentioned. The invention is based on the surprising realisation that the current transmission principle of the roller head according to U.S. Patent application Ser. No. 667,021, in which a so-called inner roller can readily be transferred to a known pendulum roller head of the aforementioned type by replacing the current transmission by fluid metal existing in the latter with an annular disc having a flexibly designed intermediate part and arranging this disc as a sliding contact current transmission device in the area of the other end of the shaft of the pendulum roller head between the shaft and the stator of the pendulum roller head. The functions of rotor and stator are interchanged as compared, with the roller head according to U.S. Patent application Ser. No. 667,021, i.e., in the pendulum roller head the stator is now outside and the rotor inside. This offers the same advantages as in the inner roller head, that is to say the problems associated with the use of fluid metal are removed, the influence of external mechanical effects on the current transmission is eliminated, as the intermediate part of the sliding contact disc can yield axially and radially in the event of eccentricity, vibrations etc, and the pendulum roller head according to the invention also manages with a minimum number of components, which considerably reduces manufacturing costs, maintenance expenditure and wear. In addition, it is possible to fulfill the requirement that the existing construction should not have to be substantially modified, so that existing pendulum roller heads can therefore be re-equipped with the sliding contact current transmission device according to the invention, i.e. the latter can be used in exchange for the fluid metal device.

Advantageous developments of the invention are described in further detail below.

In one development of the invention, the construction of the intermediate part is particularly simple and makes a problem-free transmission of very high welding currents possible.

Further developments of the invention make possible the deliberate choice of sliding contact rings which are used in the sliding contact area. Silver nickel contact rings can therefore be firmly connected to a flexible copper braid (eg. by electron beam welding), which are once again mounted (welded) in copper contact rings on the outer circumference. Instead of silver nickel, a compound of silver/graphite or silver-plated or gold-plated copper can also be used. If an intermediate ring is used for working, copper contact rings or silver-plated or gold-plated copper contact rings are welded or soldered to the flexible copper braid, instead of the silver contact rings, and the silver nickel or silver-/graphite or silver-plated/gold-plated intermediate ring is clamped to the stator or rotor as an inexpensive wearing part.

A further development of the invention makes possible the use of a disc without inherent rigidity, as the spring pressure force of the disc can be created simply by a disc spring.

In a further development of the invention, the cooling of the pendulum roller head takes place through a special emulsion containing oil, which not only intensely cools the sliding contact surfaces, but also lubricates them. As compared with conventional water, such a coolant has the advantage that the contacts are not contaminated by lime or other impurities. The emulsion used is stable, and above all, suitable for foodstuffs.

BRIEF DESCRIPTION OF THE DRAWINGS

An example of an embodiment of the invention is described in greater detail in the following with reference to the drawings.

DESCRIPTION OF THE PREFERRED EMBODIMENTS

Figure 1:
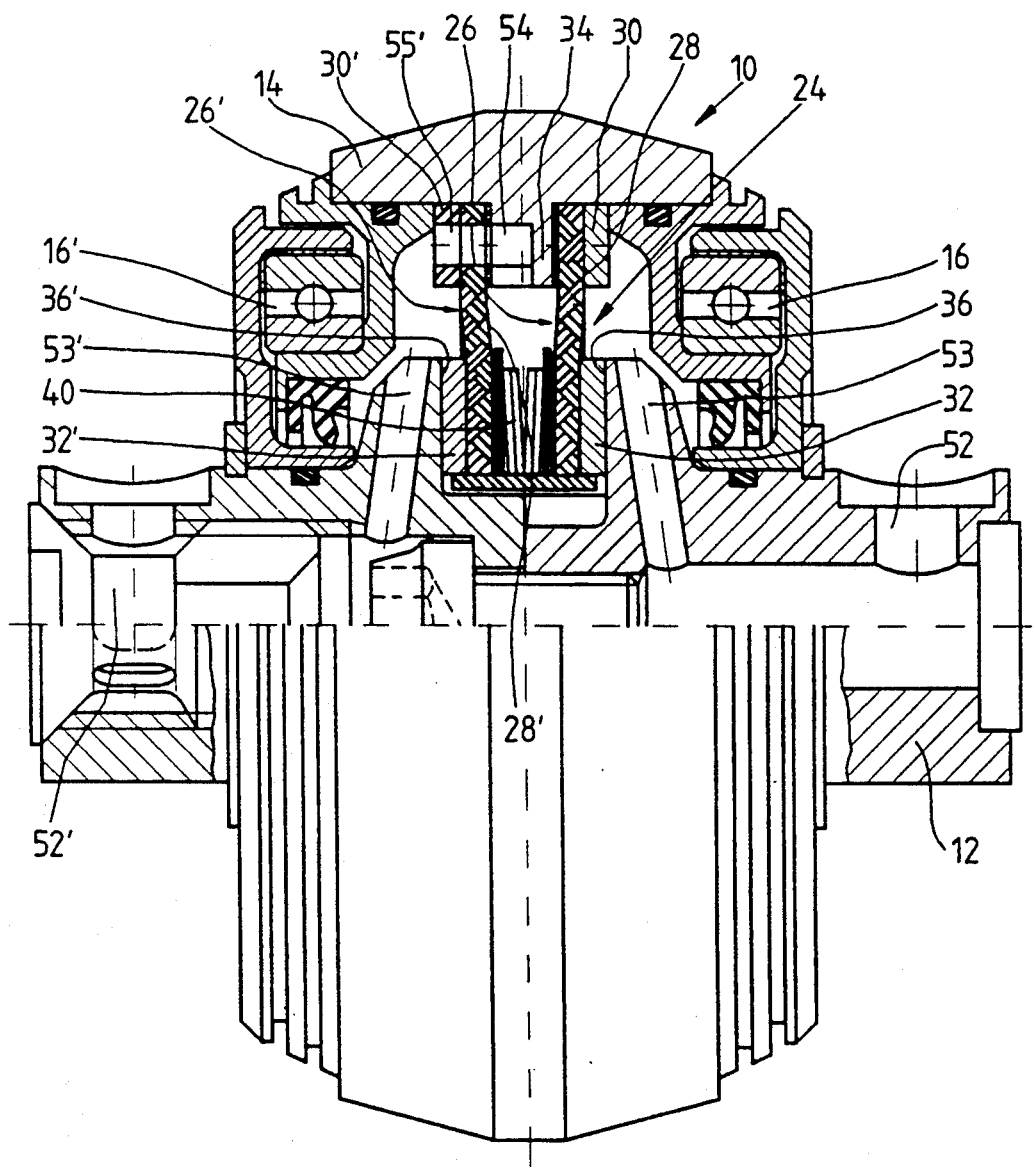
FIG. 1 shows an inner roller head according to U.S. Patent application Ser. No. 667,021.

FIG. 1 shows a sectional view of a roller head 10, which is known from hereinbefore mentioned, for an unillustrated resistance seam-welding machine for the resistance roller seam-welding of can bodies. The roller head 10 has a stator 12 which is designed as a bipartite axle, and on which a rotor 14 is rotatably mounted by means of rolling bearings 16 and 16'. (Identical reference numbers, but provided with a stroke at the top, in each case denote the other part of a pair of identically designed parts).

The stator 12 is clamped so that it conducts electricity well, at the free end of a likewise unillustrated welding arm of the resistance seam-welding machine. The welding arm and the stator 12 conduct the welding current when the resistance seam-welding machine is in operation, and for this reason are composed (like the rotor 14) of material which conducts electricity well, preferably copper. This welding current is transmitted by the stator 12 to the rotor 14, which transmits it to the welding site, preferably via an unillustrated electrode wire. For current transmission between stator and rotor a sliding contact current transmission device is provided which is indicated generally at 24, and which has two annular discs 26 and 26' which extend at a mutual axial spacing radially between rotor and stator and are flexibly designed in their intermediate bridging parts 28 and 28' between the inner and outer circumferences.

The two flexible sliding contact discs 26 and 26' are each composed of a copper braid on which a contact ring 30 and 30' respectively is axially fastened (eg. welded) to the intermediate parts 28 and 28' at the outer circumference and an axial sliding contact ring 32 and 32' respectively is axially fastened (eg. electron beam-welded) to the intermediate parts at the inner circumference. The rotor 14 has at its inner circumference a flange 34, to which the discs 26 and 26' are fastened by means of unillustrated screws so that they conduct electricity well. Each axial sliding contact ring 32 and 32' is in sliding contact with an associated annular contact surface 36 and 36' of the stator. For pressing the discs 26 and 26' against the stator 12, there is provided between the discs a spring device in the form of a stack of disc springs 40. The disc springs create the necessary contact pressure between the axial sliding contact rings 32 and 32' and the annular contact surfaces 36 and 36' of the stator 12 which are associated with the rings.

The inner space between the stator 12 and the rotor 14 is sealed by means of O-rings and shaft seals in the manner illustrated in FIG. 1. As the rotor 14 and the sliding contact surfaces have to be intensely cooled, for conducting a coolant through the roller head 10 there are provided ducts 52,52' and 53,53' in the stator 12, ducts 54 in the rotor 14 and ducts 55' in the flexible sliding contact discs (ducts corresponding to the ducts 55', which are provided in the disc 26, are not visible in FIG. 1). When the resistance seam-welding machine is in operation, coolant is conveyed into the duct 52 and flows through the duct 53, through the non-visible ducts of the disc 26, through the ducts 54 and 55' and finally, back through the ducts 53' and 52'.

The use of the roller head already described as a pendulum roller head will now be described, or to be more exact, the use of the sliding contact current transmission device of the roller head described heretofore as a replacement for the current transmission device of a known pendulum roller head operating with fluid metal. For a better understanding, a pendulum roller head known from DE-C2 No. 3710875 is firstly described with reference to FIGS. 4 and 5.

Figure 4:
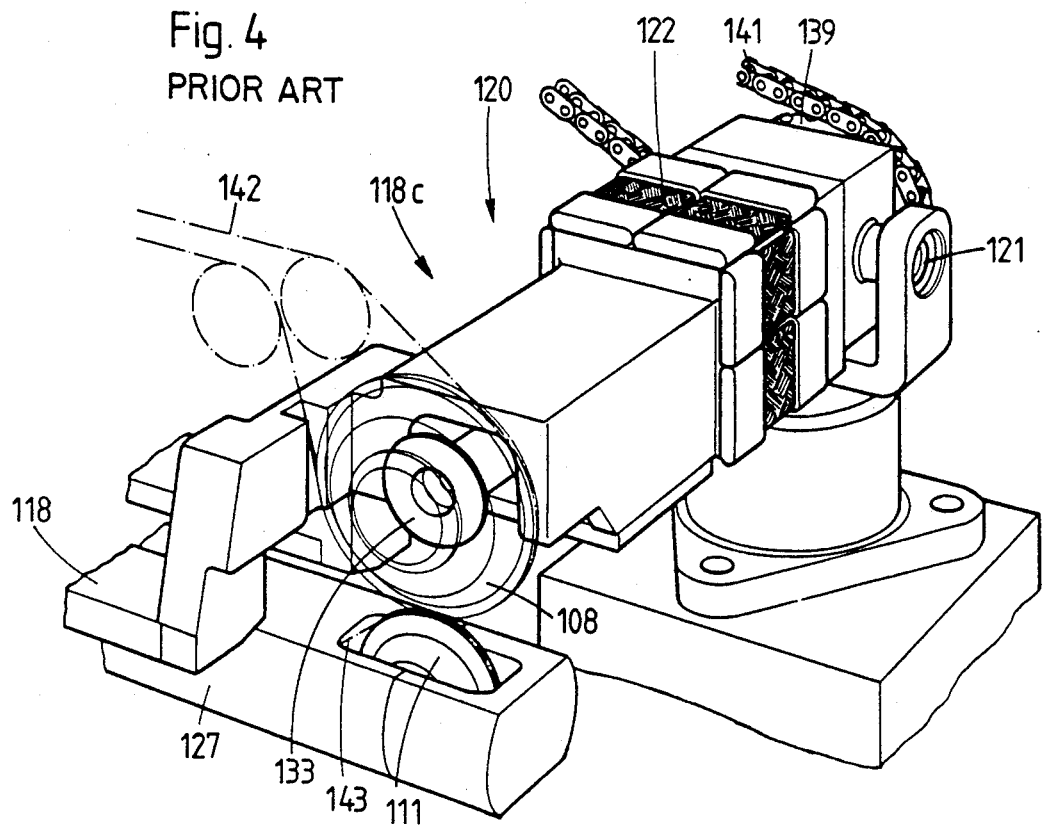
FIG. 4 shows a known pendulum roller head for a resistance seam-welding machine.

FIG. 4 shows a pendulum roller head 120 of an only partially illustrated resistance seam-welding machine for welding can bodies. Blanks for the can bodies which are to be formed are brought into a cylindrical shape and by means of an unillustrated Z rail are made to overlap at the point where the longitudinal seam is to be produced, and in this state are inserted, by means of a likewise non-visible conveying chain carrying conveying pawls, between an upper electrode roller 108 and a bottom electrode roller 111-for longitudinal seam-welding. All this is known, eg. from DE-OS No. 2559671 originating from the applicant himself, and for this reason does not need to be described in greater detail here.

The welding current is supplied from an unillustrated welding transformer via a first conductor rail 118. One half 120b of a stator of the pendulum roller head 120 is electrically conductively connected to an adjacent part 118c of the first conductor rail 118 by flexible conductive straps 122 in a way which is described in greater detail further on below. The pendulum roller head 120 has a pendulum arm 123 in the form of a hollow shaft which is provided with a supporting flange 133, which is rotatably mounted at its one end in the other right-hand half 120a of the stator and carries the upper electrode roller 108 at its other end. The electrode roller 108 simply requires cooling in its interior, for which cooling fluid (eg. water) is fed in and carried away via the hollow shaft 123. The electrode roller 108, however, contains no sliding contact current transmission device like the roller head 10 in FIG. 1, as the current transmission to the rotating shaft 123 takes place in the area of the stator 120a and 120b of the pendulum roller head 120.

The current return line, ie. the line leading from the lower electrode roller 111 back to the welding transformer, is composed of a lower arm 127 which carries the bottom electrode roller 111 at one end and is connected at the other end to a second conductor rail (not illustrated) which leads to the welding transformer.

The pendulum roller head 120 is constructed according to the principle of a tare balance, in such a way that its pendulum mounting 121 supports the entire weight and the upper electrode roller 108 rests practically weightlessly on the lower electrode roller 111. For setting a certain pressure force, there is provided an unillustrated spring which presses from above on the axle of the upper electrode roller 108. At the other end of the pendulum arm 123, which is rotatably mounted in the right-hand half 120a of the stator of the pendulum roller head 120, there is fastened a toothed sprocket 139 through which, by means of a chain 141, the pendulum arm 123 and also the upper electrode roller 108 can be set in rotation. A wire electrode 142 is led around the upper electrode roller 108. An identical wire electrode 143 is led around the lower electrode roller 111. These wire electrodes serve to prevent the contamination of the electrode rollers from the formation of a compound with metal of the welding material (eg. tin, if tin-plate can bodies have to be welded), which is known from the above-mentioned DE-OS No. 2559671 and from DE Patent 3516397 likewise originating from the applicant, and for this reason likewise does not need to be further explained here. The right-hand half 120a of the stator of the pendulum roller head 120 contains rolling bearings 137 for the rotatable mounting of the pendulum arm 123, according to FIG. 5. The half 120b of the stator shown on the left in FIG. 5 contains, between two sealing rings 144, an annular chamber (toroid) 146 which is filled with fluid metal which serves to transmit current from the stator to the pendulum arm 124. This current transmission by the fluid metal contained in the annular chamber is replaced in the way described below by current transmission according to the principle of the roller head 10 illustrated in FIG. 1, regarding which, reference is now made to FIGS. 2 and 3.

Figure 2:
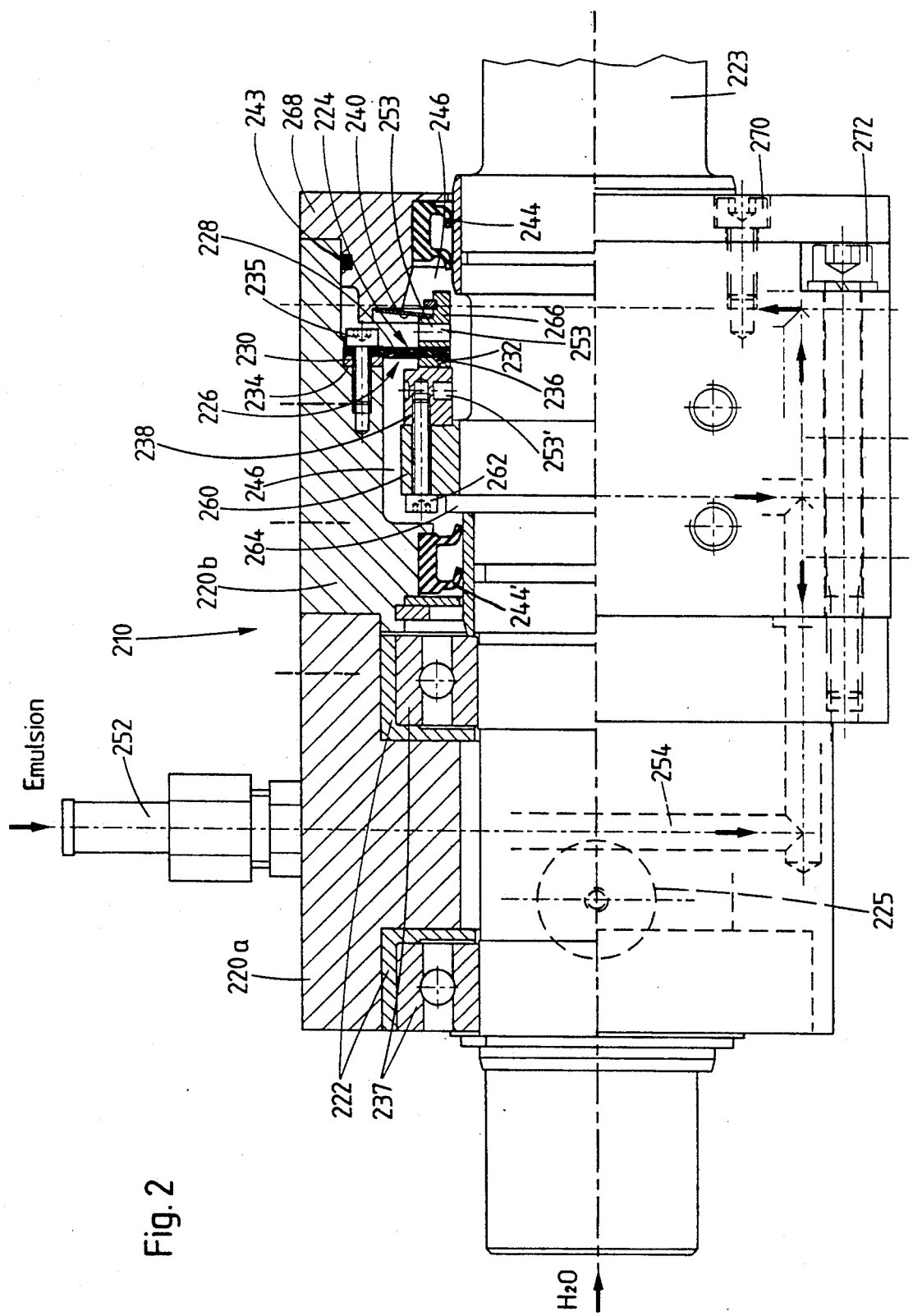
FIG. 2 shows a partial longitudinal sectional view of a pendulum roller head according to the invention with the same sliding contact current transmission device as the roller head in FIG. 1.
Figure 3:
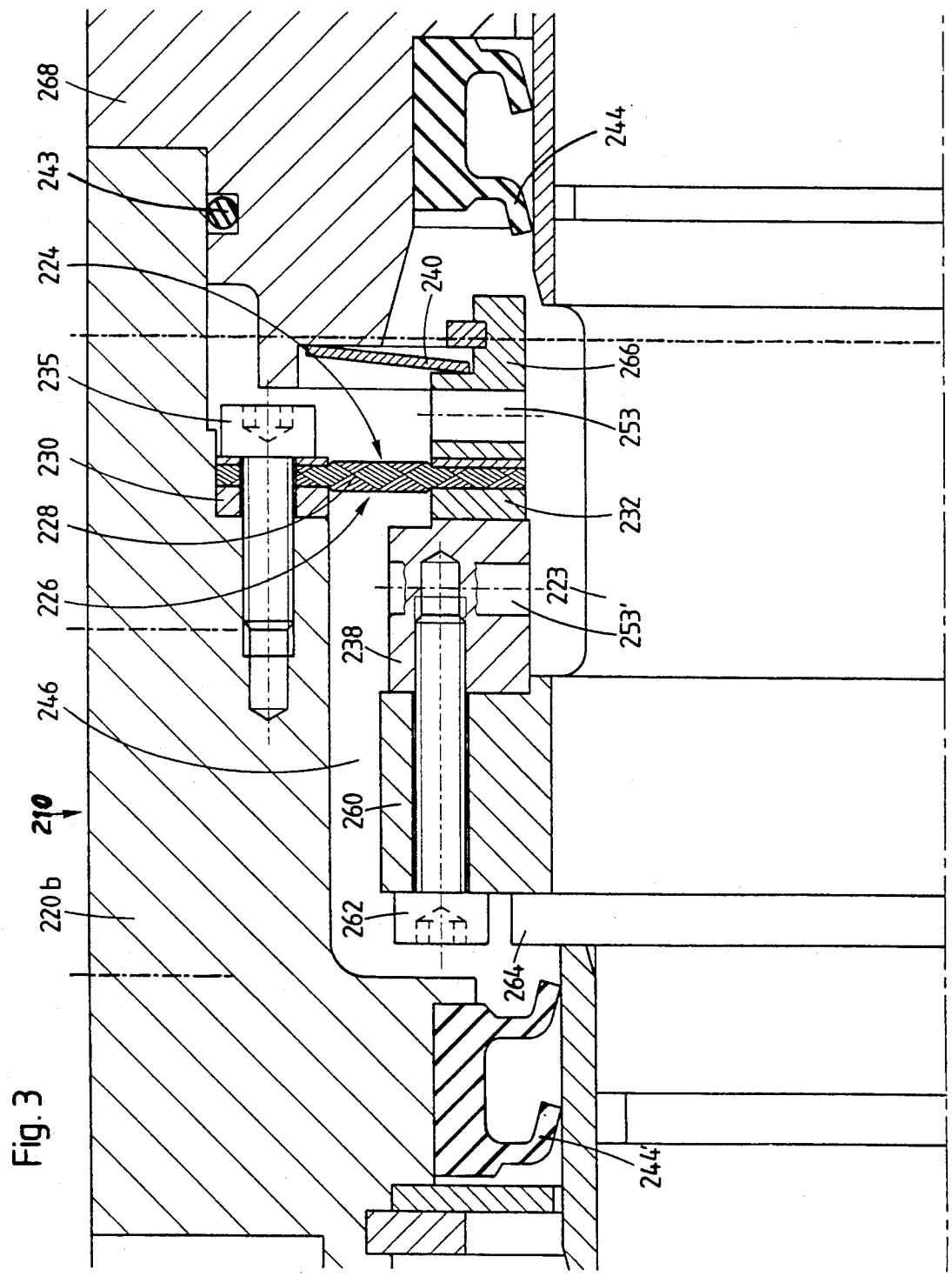
FIG. 3 shows am enlarged illustration of a detail of the pendulum roller head in FIG. 2, from which the construction of an annular disc serving as a sliding contact current transmission device can be better seen.
Figure 5:
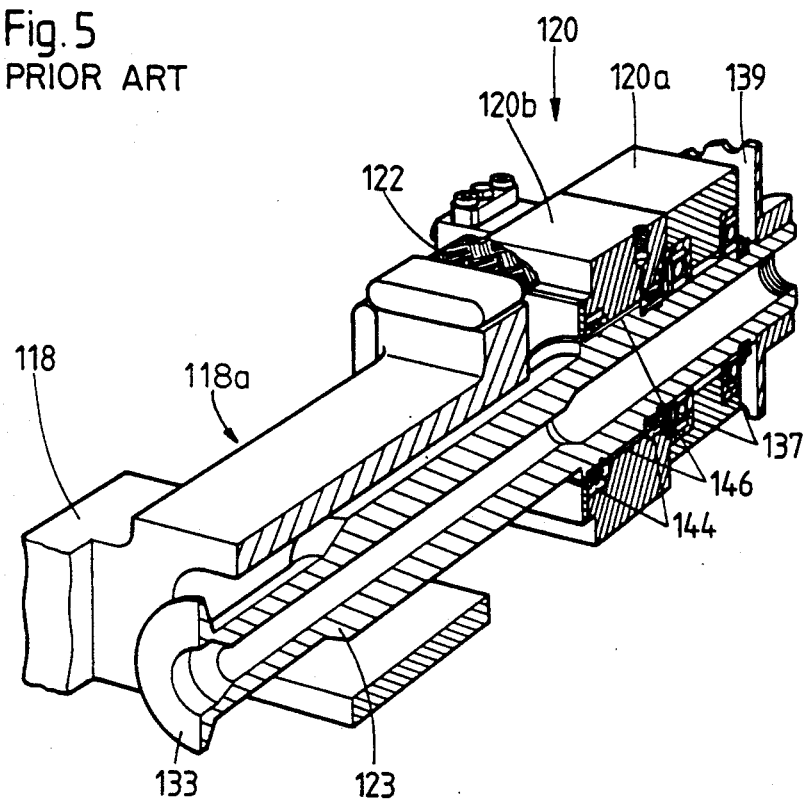
FIG. 5 shows a partial longitudinal sectional view of the pendulum roller head in FIG. 4.

In FIGS. 2 and 3, the same parts as those shown in FIGS. 1, 4 and 5 carry the same reference numbers, but increased by 200 or 100. Moreover, the illustration in FIGS. 2 and 3 is a mirror image of that in FIGS. 4 and 5. The stator half 220a in FIGS. 2 and 3 is therefore on the left of the stator half 220b instead of the right.

The stator half 220a contains the rolling bearings 237 for the rotatable mounting of the pendulum arm 223. The rolling bearings 237 are electrically insulated from the stator half 220a by means of bushes 222 of insulating material. The current transmission to the stator half 220b, which can be insulated from the other half 220a, occurs by means of current-carrying straps which are not illustrated in FIGS. 2 and 3, in the manner which is described with reference to FIGS. 4 and 5. The pendulum arm 223 is once again designed as a hollow shaft with a bore 225. Through the bore 225, water is supplied to the electrode roller fastened to the right-hand end of the pendulum arm 223, which is not visible in FIGS. 2 and 3, through the end illustrated on the left in FIG. 2, this water also being conveyed away again via the bore 225 and the left hand end in a manner which is not illustrated in greater detail.

The right-hand half 220b of the stator conducts the welding current and for this reason, like the pendulum arm 223, is composed of material which conducts electricity well, preferably copper. This welding current has to be transmitted from the stator half 220b to the rotor, which is designed as a hollow shaft 223 with a flange-mounted electrode roller transmitting the welding current to the welding site, as described above with reference to FIG. 4. For the transmission of current between stator and rotor there is provided a sliding contact current transmission device which is indicated generally by 224. The transmission device 224 comprises an annular disc 226 which extends between stator and rotor and is flexibly designed in its intermediate bridging part 228 between the inner and outer circumferences.

The flexible sliding contact disc 226 is composed of a copper braid to the intermediate bridging part of which a contact ring 230 is axially fastened (eg. welded) on the outer circumference of the disc, and an axial sliding contact ring 232 is axially fastened (eg. electron beam-welded) on the inner circumference of the disc. The stator half 220b is provided with an annular shoulder 234, to which the disc 226 is fastened by screws 235 so as to conduct electricity well. The axial sliding contact ring 232 is in sliding contact with an associated annular contact surface 236 of the pendulum arm 223. The pendulum arm 223 is provided with a counter-contact ring 238, which is consequently also a part of the sliding contact current transmission device 224 and has the annular contact surface 236. In the exemplified embodiment illustrated, the counter-contact ring 238 is screwed by means of screws 262 to a further annular collar 260, the collar 260 being non-rotatably connected to the shaft 223 and supported against a flange 264 of the shaft 223 on the left in FIG. 2. The annular collar 260 is connected to the shaft 223 so that it conducts electricity well and like the counter-contact ring 238, is preferably composed of copper. A disc spring 240 serves to press the axial sliding contact ring 232 against the annular contact surface 236. The disc spring bears at its radially inner end against a pressure ring 266, which forms a further stationary part of the sliding contact current transmission device 224, and for its part bears against the disc 226 in order to create the necessary contact pressure between the axial sliding contact ring 232 and the annular contact surface 236 which is associated with the ring 232. The disc spring 240 is supported with its radially outer end against the inside of a sealing cover 268, which is fitted into the stator half 220b and is fastened thereto by means of screws 270. The stator halves 220a and 220b are fastened to each other by means of screws 272.

The annular chamber (toroid) 246 in the stator half 220b is sealed with the aid of an O-ring 243 and by means of shaft seals 244 and 244', in the manner illustrated in FIG. 2. As the sliding contact current transmission device 224 and also the rotor 223 and the stator 220a,220b have to be cooled, ducts 252 and 254 are provided in the stator and ducts 253 and 253' in the stationary pressure ring 226 or in the counter-contact ring 238 revolving with the shaft 223, in order to convey a coolant through the pendulum roller head 210. These ducts are not in communication with the bore 225 of the shaft 223, so that a different coolant from that for the electrode roller can be used here, eg. an emulsion coolant. This other coolant is introduced through the duct 252 into the stator, flows through the duct 254 into the annular chamber 246, in which the sliding contact current transmission device 224 is situated, passes through the ducts 253 and the ducts 253' and arrives at an unillustrated outlet, all of which is indicated by arrows in FIG. 2. The circuit of the emulsion is thus fully separated from the circuit of the cooling water.

A stable, and above all, foodstuff-friendly emulsion, which is composed of 82% water, 15% rapeseed oil and 3% emulsifier, is used as a coolant for cooling and simultaneous lubrication. The emulsifier ML-55-F commonly known as polyoxyethylene (20) sorbitan monolaurate, of Hefti AG, Zürich, has proved to be particularly suitable. More precise details about this emulsifier are to be found in technical data sheet No. 3.201-d of Hefti AG.

In order to produce the emulsion, water, rapeseed oil and emulsifier are combined together and mixed for a few minutes in a mixing unit (beam mixer, possibly with dispersing head) specially provided for the purpose, until a satisfactory mixture is obtained. If such a mixing unit should not be available, the emulsion can also be produced with a cooling unit which is attached to the resistance seam-welding machine. The procedure would be the same but the mixing time then amounts to 10-18 hours. The temperature during the mixing process should always be between 15° and 50° Celsius. In order to prolong durability, a stabilizer can, if necessary, be mixed with the emulsion (as in the case of coolants and lubricants of machine tools). The temperature during storage of the emulsion should lie between 15° and 50° Celsius.

If the quantity of emulsion during can production should decrease too sharply (eg. because of evaporation), this could simply be added to the cooling unit in the constituents water, rapeseed oil and emulsifier, without suspending production.

In the sale of the emulsion, for reasons of transport, there also exists the possibility of manufacturing the emulsion in the form of a concentrate. This concentrate can be so composed that it should only need to be diluted by the consumer with water in the ratio of eg. 1:4 (concentrate:rapeseed oil 75%, emulsifier 15% and water 10%).

The axial sliding contact ring 232 is preferably composed of silver nickel or silver/graphite. It can, however, also be composed of copper and be welded or soldered to the flexible copper braid which forms the intermediate part 228 of the disc 226. The associated annular contact surface 236, which is formed on the counter-contact ring 238, can be composed of copper, silver nickel, silver/graphite or silver-plated/gold-plated copper. Contact rings of copper can be welded or soldered better to the copper braid of the intermediate part 228.

In the specific embodiment illustrated in FIGS. 2 and 3, the contact ring 230 is fastened to the stator, and the current transmission takes place from the stationary axial sliding contact ring 232 to the pendulum arm 223. Instead of this, the contact ring 230 could, however, also be arranged on the inner side and fastened to the shaft 223, and the axial sliding contact ring 232 could be arranged in a radially outer position, so that the transmission of current from the stator to the flexible disc 226 would take place at this point. This variant can be readily used in the pendulum roller head described here, like the other variants of the sliding contact current transmission device forming the subject matter of U.S. Patent application Ser. No. 667,021, without this needing to be illustrated in greater detail or described. In particular, in the case of the pendulum roller head a disc can be used for current transmission which, as in the roller head according to U.S. Patent application Ser. No. 667,021, has an intermediate part of flexible spokes instead of copper braid, in which case the special spring device 240 is not necessary.

We claim:

1. A pendulum roller head for a resistance seam-welding machine comprising: a stator, a rotor including an electrode roller and a shaft which carries the electrode roller at one end of the shaft and which is rotatably mounted at the opposite end of the shaft in the stator of the pendulum roller head, a sliding contact current transmission device arranged between the stator and rotor and urged against at least one of them by spring force, and ducts for passage of a coolant in the stator, the rotor and the sliding contact current transmission device, wherein the sliding contact current transmission device has at least one annular disc which extends radially between the rotor and stator, makes contact at the inner circumference with one of the stator and rotor and at the outer circumference with the other of the stator and rotor and is flexibly designed in an intermediate bridging part between the inner and outer circumferences, and the annular disc is located as a part of the sliding contact current transmission device between the rotor and the stator in the region of the opposite end of the shaft.

2. A roller head as claimed in claim 1, characterized in that the intermediate bridging part is composed of a copper braid.

3. A roller head as claimed in claim 3 characterized in that the annular disc has an inner and an outer circumference and is provided with a contact ring at least on one of the circumferences and is fastened to a one of the rotor and the stator on the other of the circumferences.

4. A roller head as claimed in claim 3 characterized in that the annular disc is provided with a plurality of said contact rings on the inner and outer circumferences which rings are axially fastened to the intermediate bridging part.

5. A roller head as claimed in claim 3 characterized in that at least one contact ring of the annular disc is an axial sliding contact ring, which is in axial sliding contact with an annular contact surface on a one of the stator and the rotor.

6. A roller head as claimed in claim 5, characterized in that the axial sliding contact ring is composed of a material selected from the group consisting of silver nickel, silver/graphite and silver-plated/gold-plated copper, and the associated annular contact surface is composed of a material selected from the group consisting of copper and gold-plated copper.

7. A roller head as claimed in claim 5 characterized in that in order to create a spring pressure force for the annular disc, a spring device is arranged on that side of the axial sliding contact ring which is directed away from the associated annular contact surface (236), and is supported against the stator or the rotor (220a, 220b).

8. A roller head as claimed in claim 7, characterized in that the spring device is composed of at least one disc spring.

9. A roller head as claimed in claim 1, characterized in that the coolant is an emulsion containing oil which is used at the same time as a lubricant.

10. A roller head as claimed in claim 9, characterized in that the emulsion is composed of 82% water, 15% rapeseed oil and 3% emulsifier.

* * * * *